US009760333B2

(12) United States Patent
Glen et al.

(10) Patent No.: US 9,760,333 B2
(45) Date of Patent: *Sep. 12, 2017

(54) PIXEL CLOCKING METHOD AND APPARATUS

(75) Inventors: David I. J. Glen, Toronto (CA); Collis Quinn Carter, Richmond Hill (CA); Natan Shtutman, Richmond Hill (CA); Gabriel Abarca, Richmond Hill (CA); Jonathan Wang, North York (CA)

(73) Assignee: ATI Technologies ULC, Markham, Ontario (CA)

( * ) Notice: Subject to any disclaimer, the term of this patent is extended or adjusted under 35 U.S.C. 154(b) by 1061 days.

This patent is subject to a terminal disclaimer.

(21) Appl. No.: 12/862,303

(22) Filed: Aug. 24, 2010

(65) Prior Publication Data

US 2011/0050709 A1  Mar. 3, 2011

Related U.S. Application Data

(60) Provisional application No. 61/236,446, filed on Aug. 24, 2009.

(51) Int. Cl.
 *G09G 5/12* (2006.01)
 *G06F 3/14* (2006.01)

(52) U.S. Cl.
 CPC ............ *G06F 3/1431* (2013.01); *G09G 5/12* (2013.01); *G09G 2300/023* (2013.01); *G09G 2370/047* (2013.01)

(58) Field of Classification Search
 CPC ............... G09G 5/00; G09G 2300/026; G09G 2310/08; G09G 5/12; G09G 2370/025; G09G 2370/10; G09G 2370/22; G09G 5/008; G09G 5/04; G09G 2360/04; G09G 1/04–1/06; G06T 1/00; G06F 3/1438; G06F 3/1446; G06F 1/04–1/06
 USPC ..................................... 712/42; 713/300, 600
 See application file for complete search history.

(56) References Cited

U.S. PATENT DOCUMENTS

| | | | |
|---|---|---|---|
| 4,760,388 A * | 7/1988 | Tatsumi et al. | 345/1.3 |
| 5,544,101 A | 8/1996 | Houston | |
| 5,675,808 A | 10/1997 | Gulick et al. | |
| 5,781,768 A | 7/1998 | Jones, Jr. | |
| 5,874,928 A | 2/1999 | Kou | |
| 5,956,046 A * | 9/1999 | Kehlet et al. | 345/502 |
| 6,046,709 A * | 4/2000 | Shelton et al. | 345/1.1 |
| 6,107,984 A * | 8/2000 | Naka | G09G 1/16 345/1.3 |
| 6,256,743 B1 | 7/2001 | Lin | |
| 6,263,448 B1 | 7/2001 | Tsern et al. | |
| 6,297,817 B1 * | 10/2001 | Larson et al. | 345/213 |
| 6,307,281 B1 | 10/2001 | Houston | |
| 6,466,192 B2 | 10/2002 | Imamura | |
| 6,580,432 B1 * | 6/2003 | Leung | G06F 3/1423 345/534 |
| 6,630,913 B2 | 10/2003 | Lee | |
| 6,848,058 B1 | 1/2005 | Sinclair et al. | |

(Continued)

*Primary Examiner* — Bryan Earles
(74) *Attorney, Agent, or Firm* — Faegre Baker Daniels LLP

(57) ABSTRACT

An apparatus includes a clock circuit and a virtual pixel clock circuit. The clock circuit provides a common clock signal. The virtual pixel clock circuit provides a plurality of pixel clock signals in response to the common clock signal. One of the virtual pixel clock signals is at a different clock speed than another of the plurality of virtual pixel clock signals.

20 Claims, 4 Drawing Sheets

(56) References Cited

U.S. PATENT DOCUMENTS

| | | | |
|---|---|---|---|
| 7,800,622 B2* | 9/2010 | Schindler | G09G 5/395 345/522 |
| 7,911,473 B2* | 3/2011 | Noorbakhsh et al. | 345/531 |
| 9,122,443 B1* | 9/2015 | Lamborn | G06F 3/1446 |
| 2003/0090437 A1 | 5/2003 | Adams | |
| 2003/0137528 A1* | 7/2003 | Wasserman et al. | 345/700 |
| 2004/0046707 A1* | 3/2004 | Mori et al. | 345/1.1 |
| 2004/0075621 A1 | 4/2004 | Shiuan et al. | |
| 2004/0196212 A1* | 10/2004 | Shimizu | G06F 3/1431 345/3.1 |
| 2005/0062864 A1* | 3/2005 | Mabuchi | 348/294 |
| 2006/0007052 A1* | 1/2006 | Nakamura et al. | 345/1.2 |
| 2006/0044573 A1 | 3/2006 | Noh | |
| 2006/0197869 A1* | 9/2006 | Wang et al. | 348/537 |
| 2006/0288249 A1 | 12/2006 | Knepper et al. | |
| 2007/0024524 A1* | 2/2007 | Lai | 345/1.1 |
| 2007/0195076 A1* | 8/2007 | Wan | G09G 5/008 345/204 |
| 2007/0198870 A1* | 8/2007 | Cheng et al. | 713/500 |
| 2008/0058999 A1 | 3/2008 | Khodorkovsky et al. | |
| 2008/0143637 A1* | 6/2008 | Sunahara et al. | 345/1.1 |
| 2008/0150920 A1* | 6/2008 | Yen | 345/204 |
| 2008/0168294 A1 | 7/2008 | Batson et al. | |
| 2008/0198153 A1 | 8/2008 | Yu et al. | |
| 2009/0158078 A1 | 6/2009 | Knoth | |
| 2010/0141613 A1* | 6/2010 | Sonobe | 345/204 |
| 2010/0177016 A1* | 7/2010 | Zeng | 345/1.1 |
| 2010/0257396 A1 | 10/2010 | Batson et al. | |
| 2010/0315427 A1* | 12/2010 | Wyatt et al. | 345/502 |
| 2010/0321395 A1* | 12/2010 | Maciesowicz et al. | 345/502 |
| 2011/0050314 A1 | 3/2011 | Glen et al. | |

* cited by examiner

PIXEL CLOCKING METHOD AND APPARATUS

CROSS-REFERENCE TO RELATED APPLICATION

This application claims priority to the provisional patent application having Application No. 61/236,446, filed Aug. 24, 2009, having inventors David Glen et al., titled "PIXEL CLOCKING METHOD AND APPARATUS" and owned by instant assignee. This application is related to co-pending application Ser. No. 12/862,298, filed on even date, having inventors David Glen et al., titled "DISPLAY LINK CLOCKING METHOD AND APPARATUS", owned by instant assignee, which claims priority to provisional patent application having Application No. 61/236,444, filed Aug. 24, 2009, having inventors Quinn Carter et al., titled "DISPLAY LINK CLOCKING METHOD AND APPARATUS" and owned by instant assignee.

FIELD

The present disclosure generally relates to pixel clocking methods and apparatus, and more particularly, to methods and apparatus for providing multiple pixel clocking signals for multiple displays.

BACKGROUND

Traditional display interfaces such as VGA, DVI, HDMI, LVDS require a dedicated clock generation circuit for each simultaneously active output connected to a source device such as a PC or GPU. The relatively high cost of implementing several of these clock source circuits has been one factor that has limited the total number of simultaneous displays that could be driven at a time by a single GPU.

It is known to drive multiple displays at a time with a shared clock synthesis circuit using a reference clock such as a crystal, only if all these displays use the exact same timing (e.g., resolution, refresh rate and pixel clock rate). However, in many applications, the multiple displays may not have the same exact timing. For example, a consumer may have one type of display that operates using one timing scheme and another display that operates at a different timing scheme. In this example, the two monitors could not be driven using a shared clock synthesis circuit because they both don't have the exact same timing scheme. Therefore, in this example, a dedicated clock generation circuit is required for each of the displays.

Accordingly, a need exists for a method and apparatus that requires less clock source circuits than known source devices and has the capability drive multiple displays that operate using different timing schemes.

BRIEF DESCRIPTION OF THE DRAWINGS

The invention will be more readily understood in view of the following description when accompanied by the below figures, wherein like reference numerals represent like elements.

DETAILED DESCRIPTION

Figure 1:
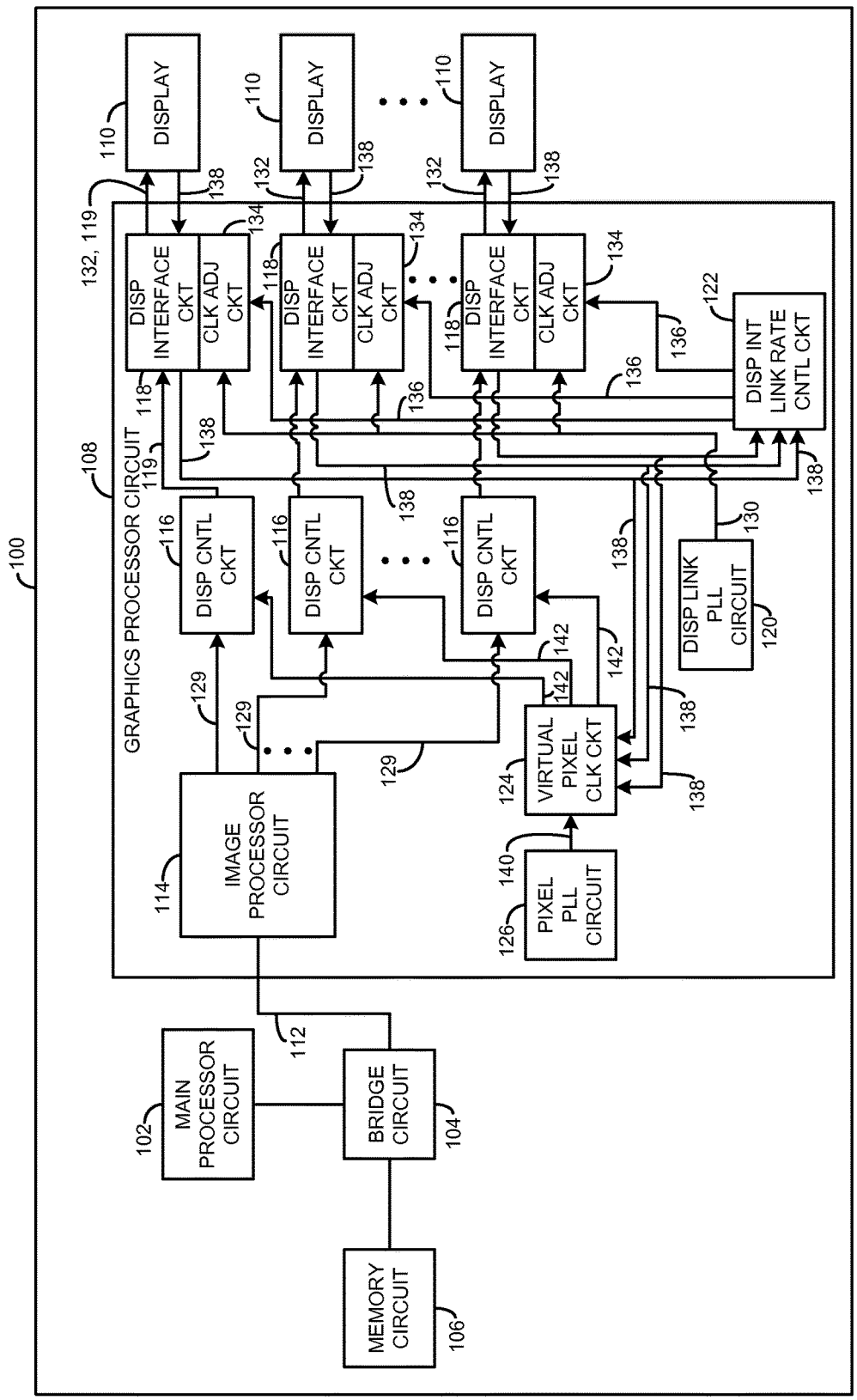
FIG. 1 is an exemplary depiction of a device including an apparatus according to the present disclosure.

In one example, an apparatus includes a display link clock circuit and a plurality of display interface circuits. The clock circuit provides a common display link clock signal. The display interface circuits each provide a respective display link clock signal in response to the common display link clock signal. One of the display link clock signals is at a different clock speed than another of the display link clock signals. In another example, the apparatus includes a pixel clock circuit and a virtual pixel clock circuit. The pixel clock circuit provides a common pixel clock signal. The virtual pixel clock circuit provides a plurality of pixel clock signals in response to the common pixel clock signal. One of the virtual pixel clock signals is at a different clock speed than another of the virtual pixel clock signals. A related method is also disclosed.

The method and apparatus provide, among other advantages, a reduced number of clock circuits required to drive multiple displays having various timing characteristics. Reducing the number of required clock circuits in the apparatus advantageously reduces the size and cost of the apparatus. In addition, power consumption is also reduced due to the reduced number of clock circuits. Other advantages will be recognized by those of ordinary skill in the art.

In one example, each of the display interface circuits include a clock signal adjuster circuit. The clock signal adjuster circuit provides the display link clock signal by selectively scaling the common display link clock signal.

In one example, the apparatus includes a display interface link rate control circuit. The display interface link rate control circuit controls the clock signal adjuster circuit to scale the common display link clock signal based on display identification information associated with a display. In one example, each respective display link clock signal drives a respective display.

In one example, the virtual pixel clock circuit includes a plurality of discrete time oscillator circuits. Each of the discrete time oscillator circuits provide a respective one of the plurality of virtual pixel clock signals in response to the common pixel clock signal. In one example, each of the plurality of discrete time oscillator circuits selectively adjusts a respective one of the virtual pixel clock signals to one of a higher and lower clock speed based on display configuration information.

In one example, the virtual pixel circuit includes a discrete time oscillator control circuit. The discrete time oscillator control circuit selectively adjusts a scaling factor each of the plurality of discrete time oscillator circuits in response to display configuration information.

In one example, the apparatus includes a plurality of display control circuits. Each of the video display controllers are responsive to a respective one of the virtual pixel clock signals. In one example, each of the virtual pixel clock signals drive a respective display. As such, a plurality of displays each present an image in response to a respective one of the plurality of pixel clock signals.

In one example, computer readable medium includes information that when executed by a processor causes the to layout an integrated circuit that comprises the apparatus. In one example, the information comprises hardware description language.

The following description of the embodiments is merely exemplary in nature and is in no way intended to limit the invention, its application, or uses. For purposes of clarity, the same reference numbers will be used in the drawings to identify similar elements.

As used herein, the term "apparatus," "circuit," and/or "device" can include an electronic circuit, one or more processors (e.g., shared, dedicated, or group of processors such as but not limited to microprocessors, DSPs, or central processing units) and memory that execute one or more software or firmware programs, combinational logic circuits, an ASIC, and/or other suitable components that provide the described functionality. Additionally, the term "signal" may refer to one or more currents, one or more voltages, or a data signal. Furthermore, as will be appreciated by those of ordinary skill in the art, the layout of a "apparatus," "circuit," and/or "device" can be described and laid out in a hardware description language such as Verilog™, VHDL, and/or other suitable hardware description languages.

Referring now to FIG. 1, an exemplary functional block diagram of a device 100 such as a wireless phone, a mobile and/or stationary computer, a printer, a LAN interface (wireless and/or wired), a media player, a video decoder and/or encoder, and/or any other suitable device is depicted. The device 100 includes a processor circuit 102, a bridge circuit 104, a memory circuit 106, a graphics processor circuit 108, and a plurality of displays 110. Although referred to as a graphics processor circuit in this example, skilled artisans will appreciate that the graphics processor circuit 108 can process video information in addition to graphics information. In addition, in some embodiments, the displays 110 may be external to the device 100 if desired.

Although not depicted, in some embodiments, there may be six displays 110 aligned in a rectangular arrangement having three columns and two rows. As such, in this example, each of the displays 110 can present ⅙ of a frame so that the combination of all the displays 110 present the entire frame. Although six displays 110 are discussed in this example, it is contemplated that any number of displays 110 can be included and arranged as desired.

The processor circuit 102 is operatively coupled to the bridge circuit 104 and processes requests passed to/from the bridge circuit 104. The memory circuit 106 stores information communicated from the bridge circuit 104. The bridge circuit 104 communicates image information 112 from processor circuit 102 or memory to the graphics processor circuit 108, which processes the information for presentation on the displays 110 as known in the art.

The graphics processor circuit 108 can include an image processor circuit 114, a plurality of display control circuits 116 (e.g., CRTC or other suitable display controller), a plurality of display interface circuits 118 (e.g., PHY), a display link clock circuit 120 such as a phase lock loop circuit or other suitable clock circuit, a display interface link rate control circuit 122, a virtual pixel clock circuit 124, and a pixel clock circuit 126 such as a phase lock loop circuit or other suitable clock circuit configured substantially as shown. As known in the art, phase lock loops and other clock circuits synthesize a reference clock to produce an output clock.

The image processor circuit 114 provides processed image information 129 to the display controller circuits 116 in response to the image information 112. In response to the processed image information 129, the display controller circuits 116 control the displays 110 to present an image based on the image information 112 by communicating image information 119 to the display information circuit. As noted above, in some embodiments, each display 110 can present a portion of a frame so that the entire frame is presented by a combination of all of the displays 110.

The display link clock circuit 120 provides a common display link clock signal 130 in order to provide a respective link clock signal 132 to each of the displays 110. In one example, the common display clock speed can be 540 MHz, however other clock speeds are contemplated. The link clock signal 132 provides clocking for the communication link between the display interface circuit 118 and the display 110.

Each of the display interface circuits 118 include a respective clock adjuster circuit 134. In one example, the clock adjuster circuit 134 can be a clock multiplier circuit that converts the common display link clock signal 130 into the link clock signals 132 having a speed of 1.62, 2.7, 5.4 Gbps and/or other suitable clock speed.

Each of the clock adjuster circuits 134 selectively scales the common display link clock signal 130 to provide a respective one of the link clock signals 132. In one embodiment, one or more of the link clock signals 132 can be at a different clock speed than the others. For example, if one of the displays 110 operates using a first link clock speed while another of the displays 110 operates using a second link clock speed that is different than the first link clock speed, the clock adjustor circuit 134 of the display interface circuit 132 associated with display 110 at the first link clock speed can scale the common display link clock signal 130 so that the respective link clock signal 132 is at the first link clock speed. Likewise, the clock adjustor circuit 134 of the display interface circuit 132 associated with display 110 at the second link clock speed can scale the common display link clock signal 130 so that the respective link clock signal 132 is at the second link clock speed. As such, it is possible to provide a different link clock speed for one or more of the displays 110 that is based on the common display link clock signal 130.

The display interface link rate control circuit 122 controls each of the clock adjuster circuits 134 via a respective link rate control signal 136. More specifically, the display interface circuits 118 each receive display configuration information 138 from a respective display 110. The display configuration information 138 can include information regarding the configuration of the respective display 110. Exemplary information that can be included in the display configuration information 138 includes display link rate information, pixel clock rate information, monitor type and/or make information, and/or other suitable information used to described operating characteristics of the displays 110. In one example, the display configuration information 138 can include information as described in the Display Data Channel (DDC) standard, which is incorporated herein by reference in its entirety; Extended Display Identification Data (EDID) standard, which is incorporated herein by reference in its entirety; and/or other suitable standard.

The display configuration information 138 is provided to the display interface link rate control circuit 122 from the display interface circuit 118. In response to the display configuration information 138, the display interface link rate control circuit 122 selectively controls the respective displays 110 via the link rate control signals 136 based on the display configuration information 138. For example, if one of the displays 110 operates using a first link clock speed while another of the displays 110 operates using a second link clock speed that is different than the first link clock speed, the display interface link rate control circuit 122 controls the clock adjustor circuit 134 of the display interface circuit 132 associated with display 110 at the first link clock speed to scale the common display link clock signal 130 so that the respective link clock signal 132 is at the first link clock speed. Likewise, display interface link rate control circuit 122 controls the clock adjustor circuit 134 of the display interface circuit 132 associated with display 110 at the second link clock speed to scale the common display link clock signal 130 so that the respective link clock signal 132 is at the second link clock speed. As such, each link clock signal 132 can drive a respective one of the displays 110 using a respective link clock speed.

The pixel clock circuit 126 provides a common pixel clock signal 140. In response to the common pixel clock signal 140, the virtual pixel clock circuit 124 provides a plurality of virtual pixel clock signals 142 to a respective one of the display control circuits 116. In response thereto, each of the display control circuits 116 divides lines of respective processed image information 129 into pixels. The higher the frequency of each of the virtual pixel clock signals 142, the more pixels appear on a respective display 110. Additionally, the virtual pixel clock signals 142 are rather stable and exhibit a negligible amount of jitter.

One or more of the virtual pixel clock signals 142 can be at a different clock speed in order to drive different models or types of displays. For example, if one of the displays 110 operates using a first pixel clock speed while another of the displays 110 operates using a second pixel clock speed that is different than the first link clock speed, the virtual pixel clock circuit 124 can provide the virtual pixel clock signal 142 at the first pixel clock speed to the display control circuit 116 associated with display 110 that operates at the first pixel clock speed. Likewise, the virtual pixel clock circuit 124 can provide the virtual pixel clock signal 142 at the second pixel clock speed to the display control circuit 116 associated with the display 110 that operates at the second pixel clock speed. As such, virtual pixel clock circuit 124 can provide a different pixel clock speed for one or more of the displays 110 that is based on the common pixel clock signal 140.

More specifically, the virtual pixel clock circuit 124 selectively provides each of the virtual pixel clock signals 142 at various clock speeds based on the display configuration information 138. As noted above, the display configuration information 138 can include information regarding the configuration of the respective display 110. Exemplary information that can be included in the display configuration information 138 can include display link rate information, pixel clock rate information, monitor type, and/or other suitable information used to described operating characteristics of the displays 110. Accordingly, each virtual pixel clock signal 142 can drive a respective one of the displays 110 using a different pixel clock speed.

Figure 2:
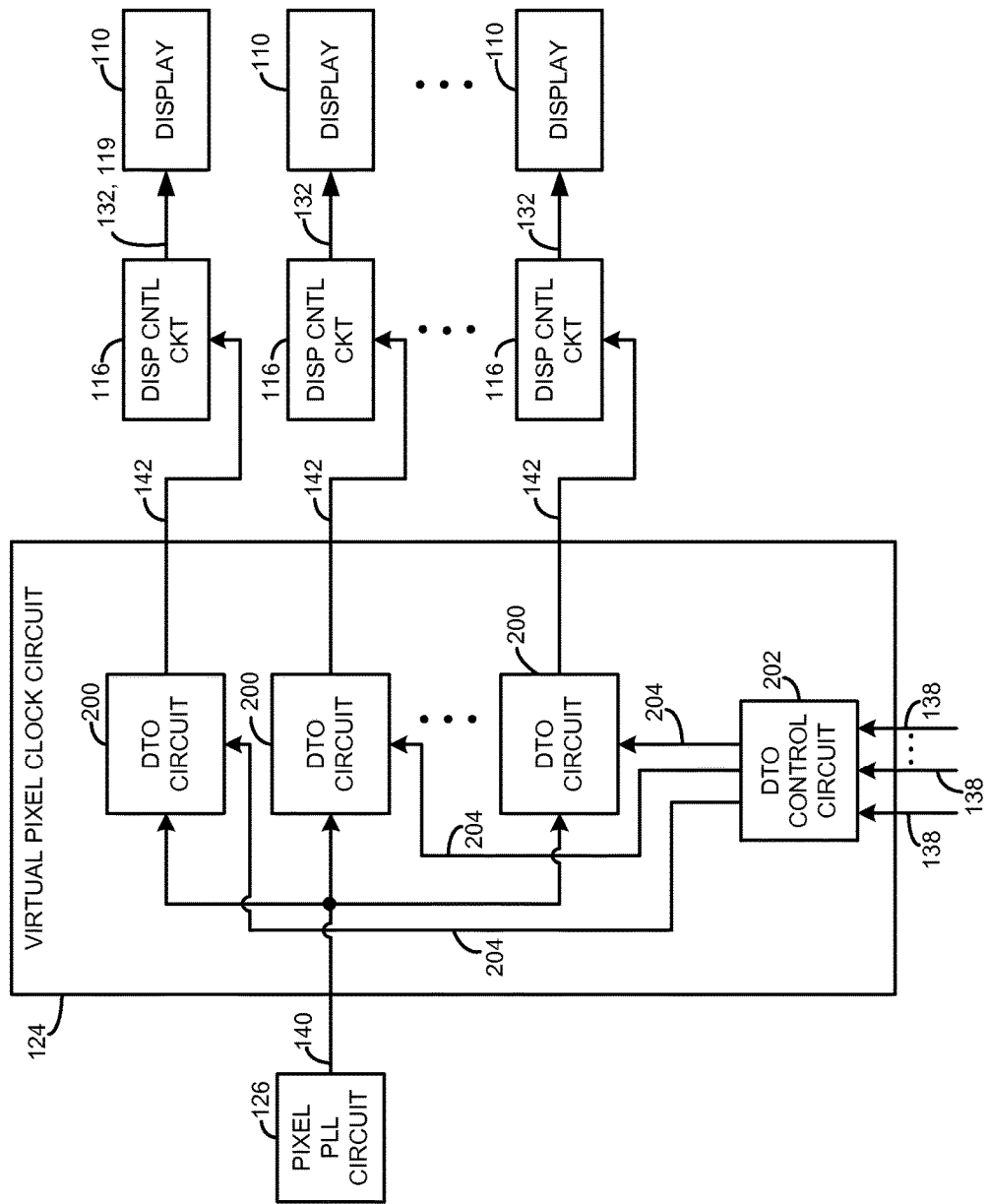
FIG. 2 is an exemplary functional block diagram of a virtual pixel clock circuit included in the apparatus.

Referring now also to FIG. 2, an exemplary functional block diagram of the virtual pixel clock circuit 124 is depicted. The virtual pixel clock circuit 124 includes a plurality of discrete time oscillator circuits 200 and a discrete time oscillator control circuit 202. The discrete time oscillator circuits 200 can be any suitable circuit that uses a programmable numerator and denominator (or ratio) and is responsive to an input clock such as the common pixel clock signal 140. The numerator and denominator (or ratio) are set to produce a desired clock rate for the virtual pixel clock signal 142 based on the common pixel clock signal 140. For example, if the common pixel clock signal 140 is at 27 MHz and pixel clock rate of 48 kHz is desired, then the ratio can be set to 48,000/27,000,000=2/1125. As such, in this example, the discrete time oscillator circuits 200 produce a pulse 2 times for every 1125 cycles of the common pixel clock signal 140. Accordingly, each of the discrete time oscillator circuits 200 provide a respective one of the virtual pixel clock signals 142 based on the common pixel clock signal 140.

The discrete time oscillator control circuit 202 selectively adjusts the ratio (or scaling factor) of each of the discrete time oscillator circuits 200 via respective discrete time oscillator control signals 204 in response to respective display configuration information 138. For example, if one of the displays 110 operates using a first pixel clock speed while another of the displays 110 operates using a second pixel clock speed that is different than the first link clock speed, the discrete time oscillator control circuit 202 controls a respective one of the discrete time oscillator circuits 200 to provide the virtual pixel clock signal 142 at the first pixel clock speed to the display control circuit 116 associated with display 110 that operates at the first pixel clock speed. Likewise, the discrete time oscillator control circuit 202 controls a respective one of the discrete time oscillator circuits 200 to provide the virtual pixel clock signal 142 at the second pixel clock speed to the display control circuit 116 associated with the display 110 that operates at the second pixel clock speed. As such, each of the discrete time oscillator circuits 200 selectively adjusts a respective one of the virtual pixel clock signals 142 based on the display configuration information 138 in order to provide a different pixel clock speed for one or more of the displays 110.

Figure 3:
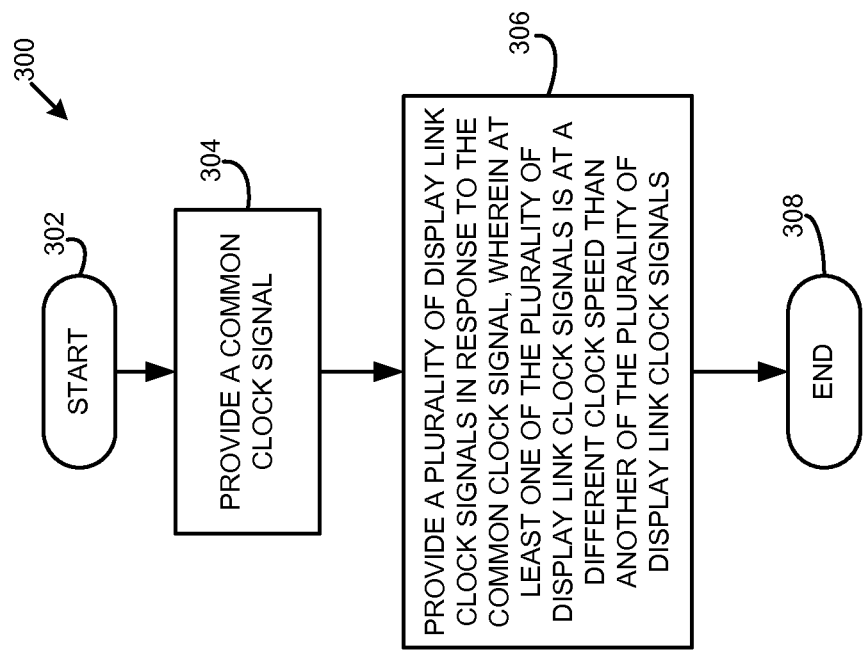
FIG. 3 is a flowchart depicting exemplary operations that can be performed by the apparatus to provide multiple display link clock signals at one or more different clock speeds.

Referring now to FIG. 3, exemplary operations that can be performed to provide the link clock signals 132 having different clock speeds are generally identified at 300. The process starts at 302. At 304, the display link clock circuit 120 provides the common display link clock signal 130. At 306, the clock adjuster circuits 134 provide the link clock signals 132 in response to the common display link clock signal 130. More specifically, each of the clock adjuster circuits 134 provide a respective one of the link clock signal 132 in response to the common display link clock signal 130 such that at least one of the respective link clock signals 132 is at a different clock speed than another of the respective link clock signals 132. As such, one or more of the display interface circuits 118 can drive a respective display 110 using a different link clock speed than another of the display interface circuits 118. Therefore, displays requiring different display link clock speeds can be driven simultaneously using a single display link clock circuit. The process ends at 308.

Figure 4:
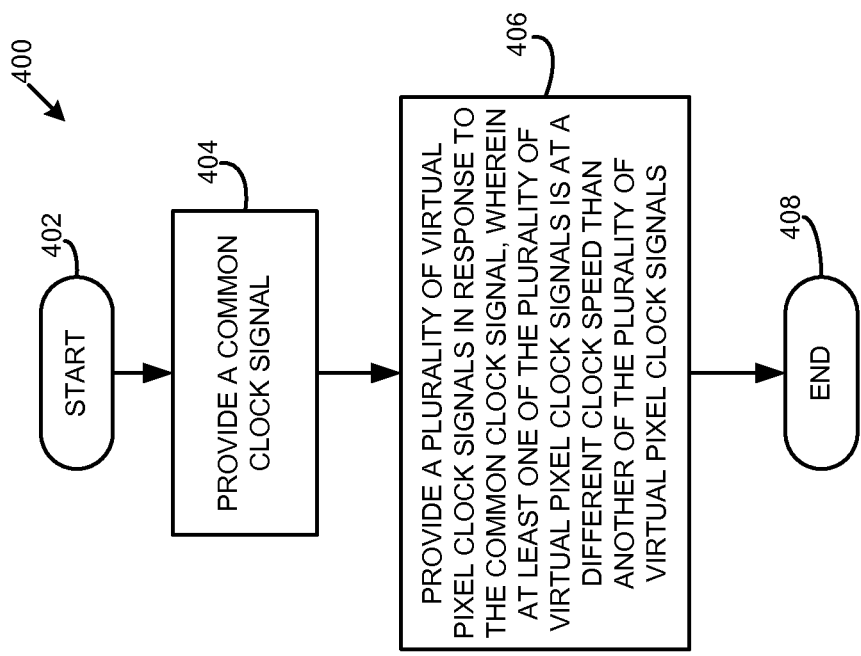
FIG. 4 is a flowchart depicting exemplary operations that can be performed by the apparatus to provide multiple pixel clock signals at one or more different clock speeds.

Referring now to FIG. 4, exemplary operations that can be performed to provide the virtual pixel clock signals 142 having different clock speeds are generally identified at 400. The process starts at 402. At 404, the pixel clock circuit 126 provides the common pixel clock signal 140. At 406, the virtual pixel clock circuit 124 provides the virtual pixel clock signals 142 in response to the common pixel clock signal 140. More specifically, the virtual pixel clock circuit 124 provides each of the virtual pixel clock signals 142 such that at least one of the virtual pixel clock signals 142 is at a different clock speed than another of the virtual pixel clock signals 142. As such, one or more of the display control circuits 116 can drive a respective display 110 using a different pixel clock speed than another of the display control circuits 116. Therefore, displays requiring different pixel clock speeds can be driven simultaneously using a single pixel clock circuit. The process end at 408.

As noted above, among other advantages, the method and apparatus provide a reduced number of clock circuits required to drive multiple displays having various timing characteristics. Reducing the number of required clock circuits in the apparatus advantageously reduces the size and cost of the apparatus. In addition, power consumption is also reduced due to the reduced number of clock circuits. Other advantages will be recognized by those of ordinary skill in the art.

Although the disclosure is described herein with reference to specific embodiments, various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure. Any benefits, advantages, or solutions to problems that are described herein with regard to specific embodiments are not intended to be construed as a critical, required, or essential feature or element of any or all the claims. In addition, unless stated otherwise, terms such as "first" and "second" are used to arbitrarily distinguish between the elements such terms describe. Thus, these terms are not necessarily intended to indicate temporal or other prioritization of such elements. The term coupled, as used herein, is defined as connected, although not necessarily directly, and not necessarily mechanically. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. The terms a or an, as used herein, are defined as one or more than one.

What is claimed is:

1. An apparatus comprising:
a clock circuit that is operative to provide a common clock signal synthesized from a reference clock signal; and
a virtual pixel clock circuit that is operative to provide a plurality of virtual pixel clock signals in response to the common clock signal, wherein a first of the plurality of virtual pixel clock signals is at a different clock speed than the common clock signal while a second of the plurality of virtual pixel clock signals is simultaneously at a different clock speed than both the first of the plurality of virtual pixel clock signals and the common clock signal, and
wherein the clock speeds of the first and second of the plurality of virtual pixel clock signals are adjusted in response to display configuration information from each of a first and a second of a plurality of displays respectively for simultaneously driving the first of the plurality of displays that operates using the first of the plurality of virtual pixel clock signals and the second of the plurality of displays that operates using the second of the plurality of virtual pixel clock signals, respectively, wherein the display configuration information from the first of the plurality of displays describes operating characteristics of the first of the plurality of displays and the display configuration information from the second of the plurality of displays describes operating characteristics of second of the plurality of displays.

2. The apparatus of claim 1 wherein the virtual pixel clock circuit comprises a plurality of discrete time oscillator circuits that are each operative to provide a respective one of the plurality of virtual pixel clock signals in response to the common clock signal.

3. The apparatus of claim 2 further comprising a discrete time oscillator control circuit that is operative to selectively adjust a scaling factor of each of the plurality of discrete time oscillator circuits in response to the display configuration information.

4. The apparatus of claim 2 wherein each of the plurality of discrete time oscillator circuits is operative to selectively adjust a respective one of the virtual pixel clock signals to one of a higher and lower clock speed based on the display configuration information.

5. The apparatus of claim 1 further comprising a plurality of display control circuits, each operatively responsive to a respective one of the plurality of virtual pixel clock signals.

6. The apparatus of claim 1 wherein the display configuration information includes at least one of a type and make information of the respective display.

7. The apparatus of claim 1 further comprising the plurality of displays each operative to present an image in response to a respective one of the plurality of virtual pixel clock signals.

8. A method of driving a plurality of displays, comprising:
providing a common clock signal synthesized from a reference clock signal; and
providing a plurality of virtual pixel clock signals in response to the common clock signal, wherein a first of the plurality of virtual pixel clock signals is at a different clock speed than the common clock signal while a second of the plurality of virtual pixel clock signals is simultaneously at a different clock speed than both the first of the plurality of virtual pixel clock signals and the common clock signal, wherein providing the plurality of virtual pixel clock signals comprises adjusting the clock speeds of the first and second of the plurality of virtual pixel clock signals in response to display configuration information from each of a first and a second of a plurality of displays respectively for simultaneously driving the first of the plurality of displays that operates using the first of the plurality of virtual pixel clock signals and the second of the plurality of displays that operates using the second of the plurality of virtual pixel clock signals, respectively, wherein the display configuration information from the first of the plurality of displays describes operating characteristics of the first of the plurality of displays and the display configuration information from the second of the plurality of displays describes operating characteristics of second of the plurality of displays.

9. The method of claim 8 comprising providing the common clock signal to a plurality of discrete time oscillator circuits that are each operative to provide a respective one of the plurality of virtual pixel clock signals in response to the common clock signal.

10. The method of claim 9 comprising selectively adjusting a scaling factor of each of the plurality of discrete time oscillator circuits in response to the display configuration information.

11. The method of claim 8 further comprising selectively adjusting the common clock signal to one of a higher and lower clock speed based on the display configuration information.

12. The method of claim 8 further comprising providing each of the plurality of virtual pixel clock signals to a respective one of a plurality of video display controllers.

13. The method of claim 8 wherein the display configuration information includes at least one of a type and make information of the respective display.

14. A non-transitory computer readable medium comprising information that when executed by at least one processor causes the layout of an integrated circuit that comprises:

a clock circuit that is operative to provide a common clock signal synthesized from a reference clock signal; and a virtual pixel clock circuit that is operative to provide a plurality of virtual pixel clock signals in response to the common clock signal, wherein a first of the plurality of virtual pixel clock signals is at a different clock speed than the common clock signal while a second of the plurality of virtual pixel clock signals is simultaneously at a different clock speed than both the first of the plurality of virtual pixel clock signals and the common clock signal, and wherein the clock speeds of the first and second of the plurality of virtual pixel clock signals are adjusted in response to display configuration information from each of a first and a second of a plurality of displays respectively for simultaneously driving the first of the plurality of displays that operates using the first of the plurality of virtual pixel clock signals and the second of the plurality of displays that operates using the second of the plurality of virtual pixel clock signals, respectively, wherein the display configuration information from the first of the plurality of displays describes operating characteristics of the first of the plurality of displays and the display configuration information from the second of the plurality of displays describes operating characteristics of second of the plurality of displays.

15. The non-transitory computer readable medium of claim 14 wherein the virtual pixel clock circuit comprises a plurality of discrete time oscillator circuits that are each operative to provide a respective one of the plurality of virtual pixel clock signals in response to the common clock signal.

16. The non-transitory computer readable medium of claim 15 further comprising a discrete time oscillator control circuit that is operative to selectively adjust a scaling factor of each of the plurality of discrete time oscillator circuits in response to the display configuration information.

17. The non-transitory computer readable medium of claim 15 wherein each of the plurality of discrete time oscillator circuits is operative to selectively adjust the common clock signal to one of a higher and lower clock speed based on the display configuration information.

18. The non-transitory computer readable medium of claim 14 further comprising a plurality of display control circuits, each operatively responsive to a respective one of the plurality of virtual pixel clock signals.

19. The non-transitory computer readable medium of claim 14 wherein the display configuration information includes at least one of a type and make information of the respective display.

20. The non-transitory computer readable medium of claim 14 wherein the information comprises hardware description language.

* * * * *